United States Patent [19]

Lander

[11] Patent Number: 4,476,469

[45] Date of Patent: Oct. 9, 1984

[54] MEANS FOR ASSISTING IN LOCATING AN OBJECT

[76] Inventor: David R. Lander, 17 Stirling Rd., Drymen, by Glasgow G63 OBW, Scotland

[21] Appl. No.: 403,510

[22] PCT Filed: Nov. 13, 1981

[86] PCT No.: PCT/GB81/00243

§ 371 Date: Jul. 13, 1982

§ 102(e) Date: Jul. 13, 1982

[87] PCT Pub. No.: WO82/01780

PCT Pub. Date: May 27, 1982

[30] Foreign Application Priority Data

Nov. 14, 1980 [GB] United Kingdom ................ 8036587

[51] Int. Cl.[3] ......................... H04Q 9/00; H04B 5/04; G08B 21/00

[52] U.S. Cl. ................................ 340/825.49; 340/539

[58] Field of Search .................. 340/825.49, 531, 539, 340/572, 568, 825.36; 367/93, 94, 197, 198, 2, 6, 117; 343/6.5 SS

[56] References Cited

U.S. PATENT DOCUMENTS

| | | | |
|---|---|---|---|
| 3,478,344 | 11/1969 | Schwitzgebel et al. . | |
| 3,780,368 | 12/1973 | Northeved et al. | 343/6.5 SS |
| 3,944,928 | 3/1976 | Augenblick et al. | 340/572 |
| 3,959,789 | 5/1976 | McGahee | 340/568 |
| 4,072,903 | 7/1978 | Harris | 340/825.48 |
| 4,191,947 | 4/1980 | Bouchard et al. | 340/531 |
| 4,242,663 | 12/1980 | Slobodin | 343/6.5 SS |
| 4,284,985 | 8/1981 | Heger | 340/572 |
| 4,297,701 | 10/1981 | Henriques | 343/6.5 LC |

FOREIGN PATENT DOCUMENTS

| | | | |
|---|---|---|---|
| 2412896 | 7/1979 | France | 340/539 |

*Primary Examiner*—Donald J. Yusko
*Attorney, Agent, or Firm*—Lyon & Lyon

[57] ABSTRACT

Locator means for assisting in locating an object (animate or inanimate) comprises a hand-held 'searcher' (50) comprising a short-range signal transmitter powered by an internal cell or battery and having electronic circuitry for generating an address signal when activated by switching means (52) and miniature 'locator' (2) comprising a transponder powered by an internal cell or battery and having electronic circuitry and signal received from the 'search'. The 'searcher' (50) may be provided with circuitry and selective switching means (FIG. 7 or 5A) for selectively addressing, with coded signals, several locators which may be placed with or on respective objects or attached thereto, e.g. by means of a small ring (8). The 'searcher' (50) is preferably torch-like with a handle (56) which may have a lug (58) for attachment of a lanyard (60) whereby the 'searcher' may be tethered to a mounting (62). The transmitter-to-transponder signalling may be by airwaves or vibrations or by electromagnetic waves preferably employing pulse position modulation. Possible forms of such transmission are described, also information as to the electronic circuitry (FIGS. 8 and 9) and constructional details of a miniature locator (16) (FIGS. 3 and 4).

8 Claims, 12 Drawing Figures

MEANS FOR ASSISTING IN LOCATING AN OBJECT

FIELD OF THE INVENTION

The present invention relates essentially to the field of human necessities while the embodiments thereof described herein relate to the fields of physics (signalling) and electricity (communication technique) or, more particularly, to transmitter-transponder systems employing electronic circuitry.

DISCLOSURE OF INVENTION

The invention was conceived to meet a basic human need—a long-felt want—namely, to have some means for helping to find lost articles of a domestic nature, such as spectacles, keys, pets, pens, jewellery, etc. The initial concept was soon extended to other applications in domestic and other environments (as will become apparent from the subsequent description herein) and can be generally described as the provision of means for assisting to ascertain the location of an object or a plurality of objects and, according to a development of the concept, assisting to ascertain selectively the location of one or more objects selected from a larger number of objects. The term "object" is intended to embrace animate objects (including human beings) as well as inanimate objects.

According to the present invention, there is provided locator means for assisting in locating an object (as hereinbefore defined), said means comprising a transmitter-transponder system which comprises: a hand-held "searcher" device comprising a short-range signal transmitter powered by an electric cell or battery in the device and having electronic circuitry for generating an address signal which will be emitted on activation of the transmitter by switching means incorporated in the searcher device; and a miniature "locator" device comprising a transponder of small size (no larger than a pocket match-box) powered by an electric cell or battery within the locator device and having electronic circuitry and means for emitting a sound signal and/or a light signal in response to the address signal received from the searcher device.

The term "short range" is, of course, to be interpreted in the context of domestic environments. It is preferably at least 20 feet or about 6 meters in normal domestic or office conditions, but there is no need to activate the transponder until the searcher is within audible or visual range when the system is used for its originally conceived purpose of helping to find lost articles of a domestic nature. In certain conditions and with certain kinds of signal emission, however, it becomes possible to transmit signals through walls or other barriers, and this extends the field of application of the invention to attention-calling or summoning of a person or thing (for example a spouse in a house or a secretary in an office or a tool in a toolroom) in another room or area which is partitioned off from the one in which the searcher is situated. It also becomes possible to adapt the system to serve as a warning or other alarm system, which may be activated by a sensor (for example, contacts on a door) which is connected to searcher when it is placed so that it is normally passive, to energise a bleeper on or near a person elsewhere in the house, for example—or even in the garden, for example—within the range of the transmitter.

As to the signal transmission, this could take various forms including air waves or vibrations (sonic or ultrasonic) or electromagnetic waves such as radio, infra-red or visible light. The address signal is preferably coded, the transponder being designed to sense its own address code so as not to be activated by extraneous signals.

The preferred mode of signal transmission is radio (with directional or omni-directional propagation, not inductive loop) but difficulties have been encountered in designing such a system having sufficient range within specified constraints of locator size and cost and a reasonable life from its small cell or battery (say, twelve months) even with a relatively low frequency carrier wave in the range 10 to 150 kHz. Infra-red requires excessive power and suffers from the disadvantage of line-of-sight transmission so that, for example, it is difficult to find objects which are hidden or shielded from the searcher. This latter disadvantage may of course also apply to the use of visible light signals, but situations can be envisaged in which a torch-like searcher device would be eminently suitable, as for locating a pet (e.g. a dog having the locator device attached to its collar) in the garden at night. Sonic and ultra-sonic signalling each have the advantage of low power requirement in the minature locator, and either of these modes of signalling would be suitable if its drawbacks (hereinafter referred to) are acceptable in the particular field of application in which the locator means of the invention is to be employed.

Other preferred features of the invention and variations of such features will become apparent from a consideration of the subsequent description, claims and drawings, having regard also to the matter disclosed in the specification and drawings of the basic British application No. 80.36587 (i.e. the priority document in respect of the present application) a copy of which forms an Appendix hereto, since it is thought that the present description and drawings will be sufficient to illustrate the invention without reproducing the large number of drawings contained in the basic application.

BACKGROUND ART

It is believed that there is nothing already known which is comparable to the locator means of the present invention. Applicant is aware of British Patent Specification Nos: 2,016,768; 1,516,740; 1,500,169; 1,427,920; 1,295,566 and 1,237,086, but these are all concerned with much larger or more complicated apparatus for commerical rather than primarily domestic purposes. Other devices which are believed to have been proposed are a so-called "listening light switch" and a bleeper which is designed to respond to hand-clapping or other human-emitted sound, but these lack the searcher device of the present invention and are susceptible to erroneous activation by extraneous sounds.

BRIEF DESCRIPTION OF DRAWINGS

Embodiments of the present invention will now be described, by way of example, with reference to the accompanying drawings, in which.

MODES FOR CARRYING OUT THE INVENTION

Figure 1:
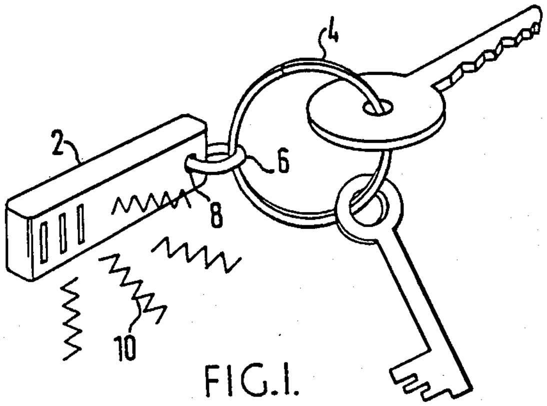
FIG. 1 illustrates a miniature locator device attached to a key-ring.

Referring first to FIG. 1, a miniature locator device or "bleeper" 2 is shown attached to a key-ring 4 by means of a small ring 6 provided in a hole 8 at one end of the body of the bleeper. This device is illustrated at 10 as emitting audible signals but alternatively or additionally it could be provided with means for emitting visual signals (for example, a small lamp or a light-emitting diode) and for this purpose the body of the bleeper 2 may comprise translucent material. The use of translucent material is also advantageous in respect of colour-coding of the bleeper to show what signal code it is responsive to, the colour-code being provided on an internal component of the bleeper, though alternatively (or additionally) colouring-coding could be provided by the colour of the body itself or could be applied to the body.

Figure 2:
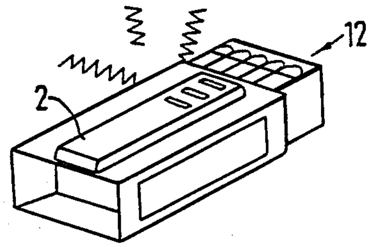
FIG. 2 shows a miniature locator device with a pocket match-box.

FIG. 2 shows a similar bleeper 2 attached to or placed upon a pocket match-box 12. If attachment to the match-box is desired, this may be achieved by various means such as one of those listed on page 6 of the basic British Specification; particularly appropriate in this case would be the provision of a contact adhesive backing strip on the underneath surface of the bleeper.

Figure 3A:
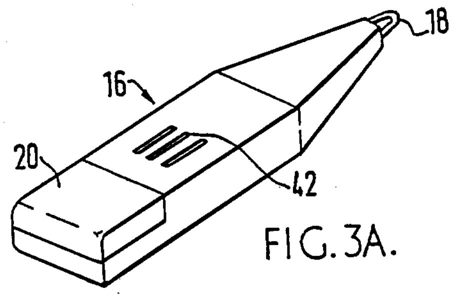
FIGS. 3A and 3B show a preferred form of miniature locator device in perspective and side view, respectively.
Figure 3B:
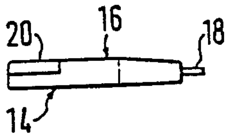

Such a surface is shown more clearly in FIG. 3B which shows the flat back or underneath surface 14 (suitable for self-adhesive strip) of the bleeper 16 shown in FIGS. 3A and 3B. This bleeper is also provided with an eye 18 projecting from one end and useful for attachment to a key-ring, for example, which eye may be incorporated with the body of the bleeper when the latter is formed by injection moulding or blow moulding, for example. These figures also show a removable lid 20 for access to a cell or battery constituting the power supply in the bleeper.

Figure 4:
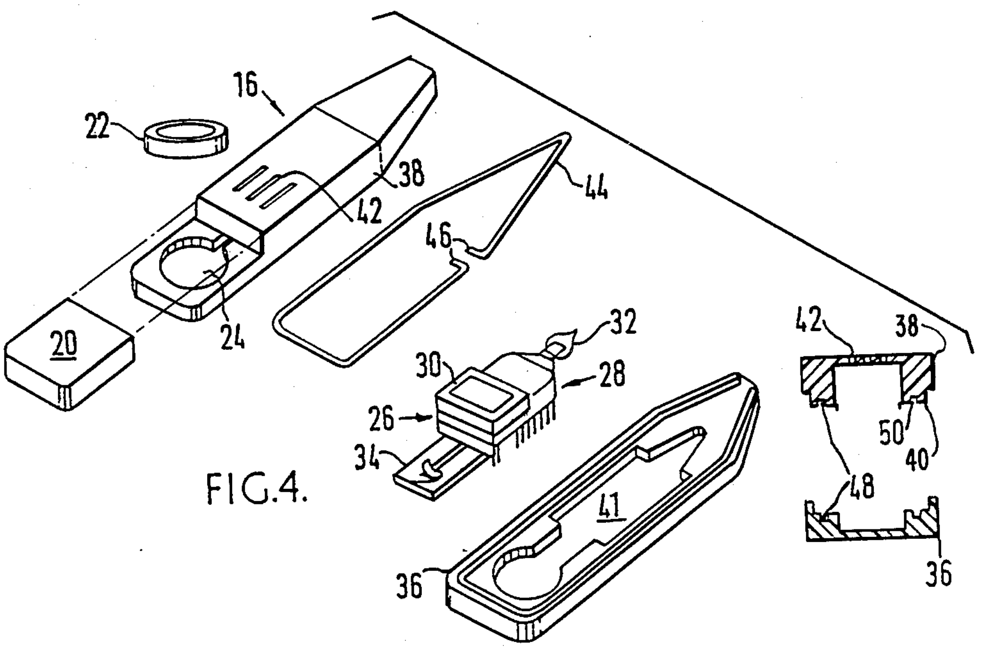
FIG. 4 is an exploded view of the device shown in FIG. 3A.

This latter feature can be seen more clearly in the exploded view of FIG. 4 which illustrates a possible constructional form for such a bleeper having a cell or battery 22, preferably of the mercury-cell type, which fits into a recess 24. The exploded view shows a unit 26 comprising a microcircuit 28, which may comprise a semi-customised ULA (uncommitted logic array), having connections to a bleep sound emitter 30 and a light emitter 32 which is preferably arranged to emit flashes of light. Connection to the cell or battery 22 is shown at 34.

The exploded view of FIG. 4 shows that the body or case of the bleeper 16 may conveniently be formed in two parts (of plastics material) namely a base 36 and a top 38 which, as shown in cross-sectional views at the right-hand side of the figure, may be designed to fit together by means of a click rim 40. The base 36 has a recess 41 suitably shaped to accommodate the internal parts of the bleeper. The top 38 has a sound emitter grid 42 and is preferably of translucent material for the purpose of colour-coding, as mentioned above, which may be provided on the microcircuit 28. Also shown is an antenna 44 of metal wire having lugs 46 for connection to the microcircuit, the wire being shaped to suit the shape of the body of the bleeper and being accommodated in grooves 48 and 50 provided in the base 36 and the top 38 respectively.

In addition to the click rim 40, the top and bottom of the case may be fixed together by means of a suitable adhesive substance or by ultra-sonic welding, for example.

The antenna 44 may in fact be a coil of wire, rather than a single loop as shown. It will be appreciated that an antenna is only required in the radio-signalling version of the invention. In versions for other forms of signally, suitable receiving devices would be provided instead of the antenna 44. For sonic operation the microcircuit 28 could be arranged so that the sound emitter 30 would double as a signal receiver, listening for transmitted search signals until activated by such signal having the appropriate address code to cause the bleeper (or transponder) to produce an output signal from the sound emitter 30 and the light emitter 32.

The circuitry and mode of operation are preferably chosen to maintain a very low power requirement when the miniature locator is in its listening mode, so that, with normal use, the cell or battery 22 will have a reasonable life (preferably at least twelve months). The electrical parts of the bleeper can be designed to operate with a power supply consisting of two 1.4-volt cells in series.

It is a noteworthy feature of this miniature locator that it has no external controls. It is arranged to operate entirely automatically in response to received signals of the appropriate address code. The operation may be arranged so that a sound/light output is only produced in direct response to an appropriately coded signal from the searcher device. Alternatively, the circuit arrangements could be such that, once activated, the bleeper output continues indefinitely, in which case it could be stopped by removing the cell or battery 22. In the first case just mentioned the circuitry in the bleeper can be arranged to respond to the coded address signal from the searcher in such a way that the sound/light output is similarly coded, thus identifying the locator to the person using the searcher.

Considering now the searcher device and the possible forms it may take, several such forms are shown in FIGS. 5A and 5B, FIG. 6 and FIG. 7 respectively. The first two forms are designed to have the general characteristics of an electric torch with a handle and a front end which may give the impression to the user that he or she is directing a beam out of it (which will in fact be the case if ultra-sonic or infra-red transmission is empoyed) and indeed, though this is not illustrated, an electric lamp could be incorporated in the front end to provide a beam of light which may be advantageous when the searcher is used in the dark, as already mentioned herein.

Figure 6:
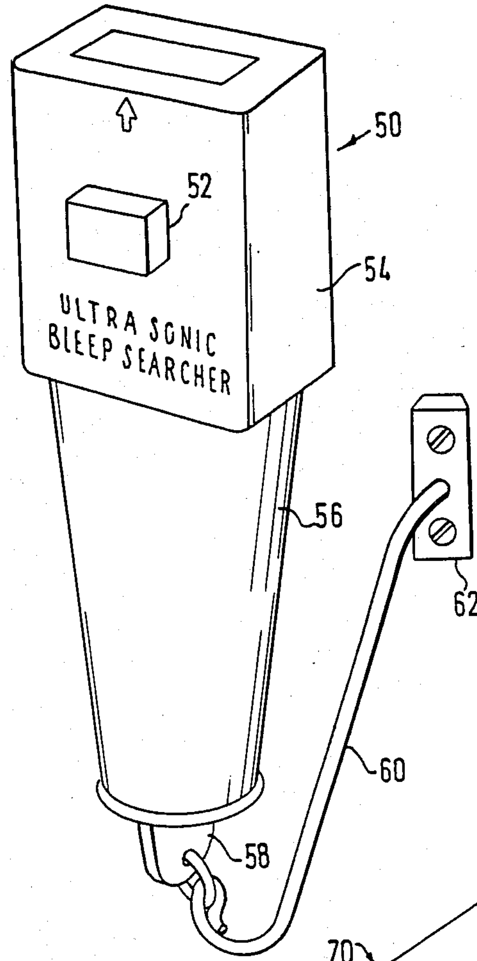
FIG. 6 illustrates an alternative form of searcher device with a lanyard which may be provided for tethering it to a wall or other mounting.

Considering first the searcher device 50 of FIG. 6, this is designed for transmission of a single ultra-sonic address signal on activation of suitable circuitry (which it is thought unnecessary to describe here as it could be conventional) under the control of a single pushbutton 52. The circuitry and battery for powering it are contained within the body 54 and handle 56 of this device. The latter may terminate, as shown, in a lug 58 with a lanyard 60 tethering the device to a wall-plate 62, for example, or other mounting.

An alternative and preferred mounting arrangement for this and other forms of searcher device is a wall bracket on which the device is parked when not in use, the device having switching means for switching the power supply battery off when in its stowed position on the wall bracket. Also, though again not illustrated, means may be associated with the stowage to connect the searcher device to a sensor as previously mentioned herein, which can over-ride the battery switching means and render the searcher device active. This feature would of course relate best to a radio signalling form of the locator means of the invention.

Figure 5A:
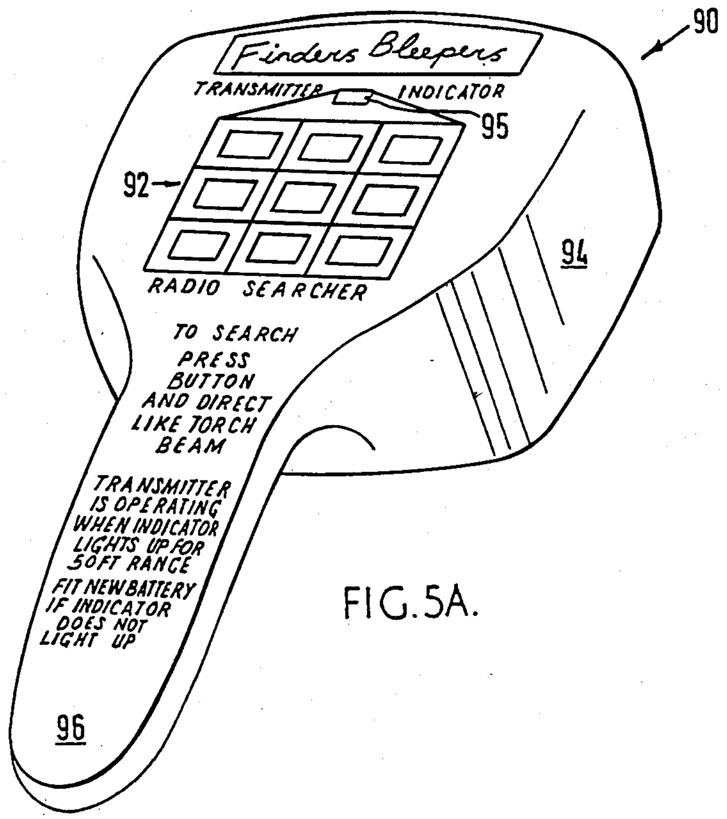
FIGS. 5A and 5B illustrate a searcher device in rear and front perspective views respectively.
Figure 5B:
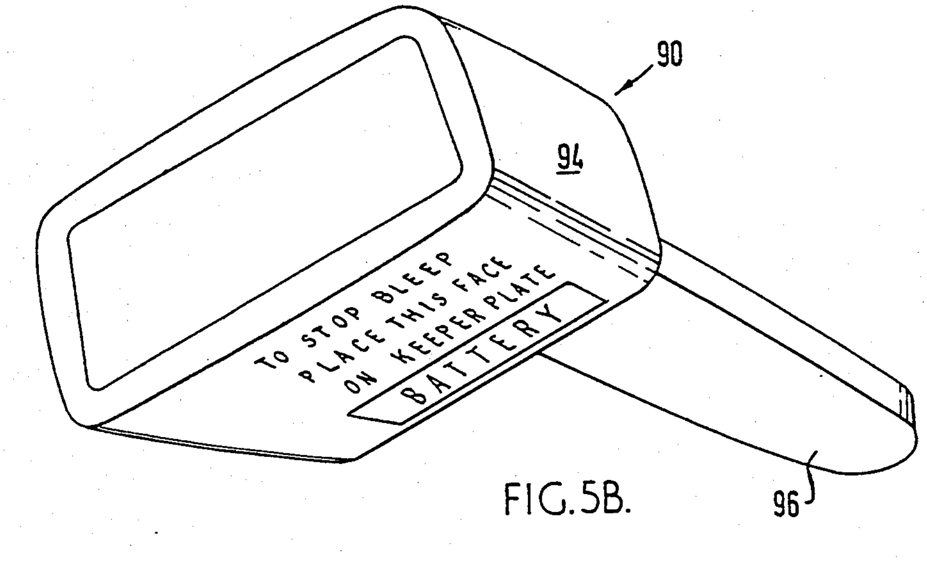
Figure 7A:
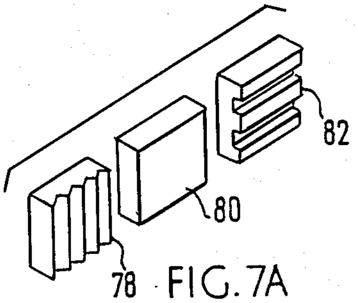
FIG. 7 illustrates another alternative form of searcher device with optional blind-aid push buttons illustrated in FIG. 7A.
Figure 7:
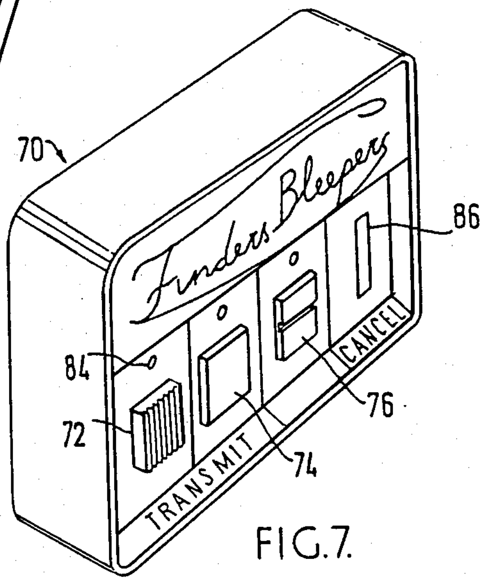

The searcher devices shown in FIGS. 5A and 5B and in FIG. 7 are designed for selective address-code transmission. The searcher device 70 of FIG. 7 is designed for three address codes, selected by respective push buttons 72, 74 and 76 which may be differently coloured and may have different feel to aid blind persons. Examples of three push-button surfaces with different feel are shown at 78, 80 and 82 in FIG. 7A. The dots 84 above the respective push buttons represent indicator lights which shine to confirm that the transmitter is radiating or emitting the coded address signal. The FIG. 7 embodiment also incorporates a "cancel" switch 86 to terminate the transmission, though it may well be preferable to provide electronic circuitry such that the transmission terminates automatically after a certain time or only occurs while the "transmit" button is pressed.

The searcher device 90 of FIGS. 5A and 5B is designed for a larger number of selectable address signals controlled by buttons in an array 92 in an upper surface of the body 94 of the device. A "transmitter indicator" light 95 is also provided. While this form of device could be handly for any of the signalling modes previously mentioned, it was in fact designed as a radio searcher with an antenna coil in the handle 96. The handle also forms a convenient surface for instructions for use, such as the legend shown: TO SEARCH PRESS BUTTON AND DIRECT LIKE TORCH BEAM—TRANSMITTER IS OPERATING WHEN INDICATOR LIGHTS UP FOR 50 FT. RANGE—FIT NEW BATTERY IF INDICATOR DOES NOT LIGHT UP. Thus the electronic circuitry is arranged to prevent the transmitter indicator-light shining when the battery needs to be renewed.

Figure 8:
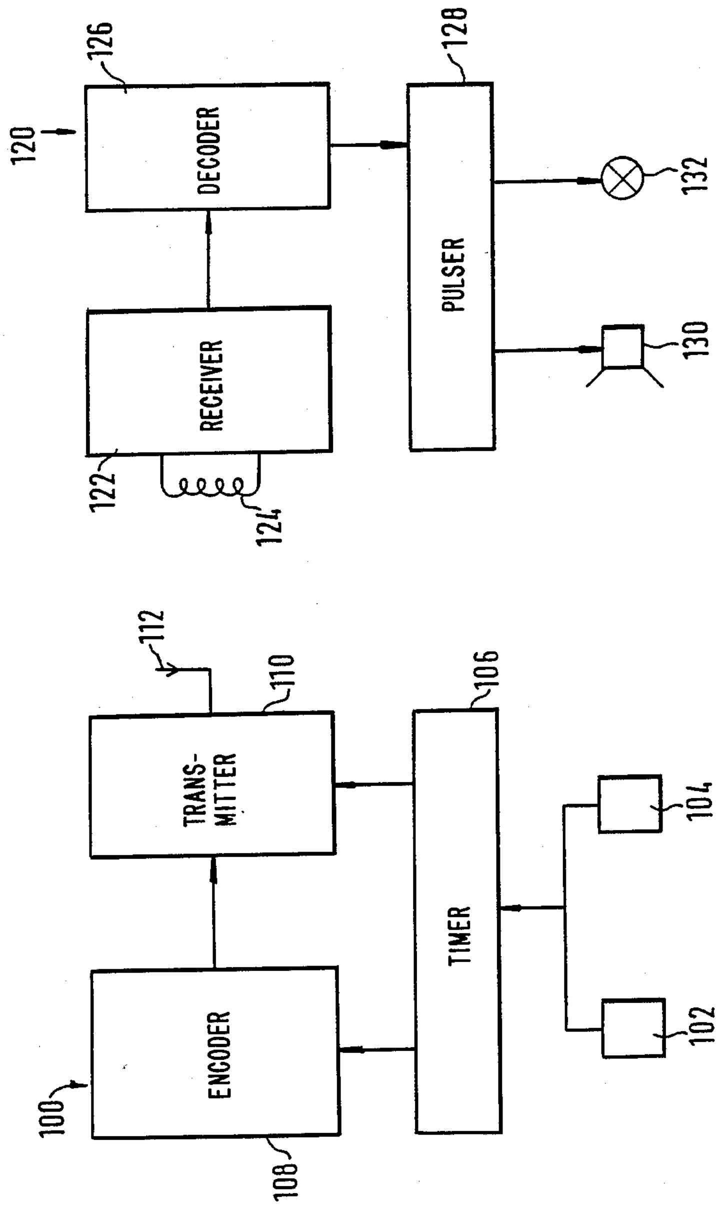
FIG. 8 is a block diagram of a transmitter-transponder system indicating the elements of the searcher device and the locator device in one embodiment of the invention.

The block diagram of FIG. 8 shows the elements of a transmitter-transponder system embodying the present invention and employing radio transmission of a single coded address signal. This comprises a transmitter unit 100 (in the searcher device) comprising a push switch 102 and a remote control socket 104 connected in parallel to a timer 106 which controls an encoder 108 and a transmitter 110 which also receives the output of the encoder and emits the coded address signal from an antenna 112. Pulse-position-modulation of a radio frequency carrier wave is employed, the frequency being preferably in the range 10 to 150 kHz as previously mentioned herein. The system further comprises a receiver unit 120 (in the locator device) which comprises a receiver 122 having an antenna coil 124 and provides an output to a decoder 126 which in turn provides an output to a pulser 128 energising a bleeper 130 (i.e. an acoustic emitter) and a lamp 132. The latter could alternatively be a light-emitting diode but this might have the disadvantage of directional output, which disadvantage could be obviated by optical means or by providing a plurality of such diodes in different orientations.

Figure 9:
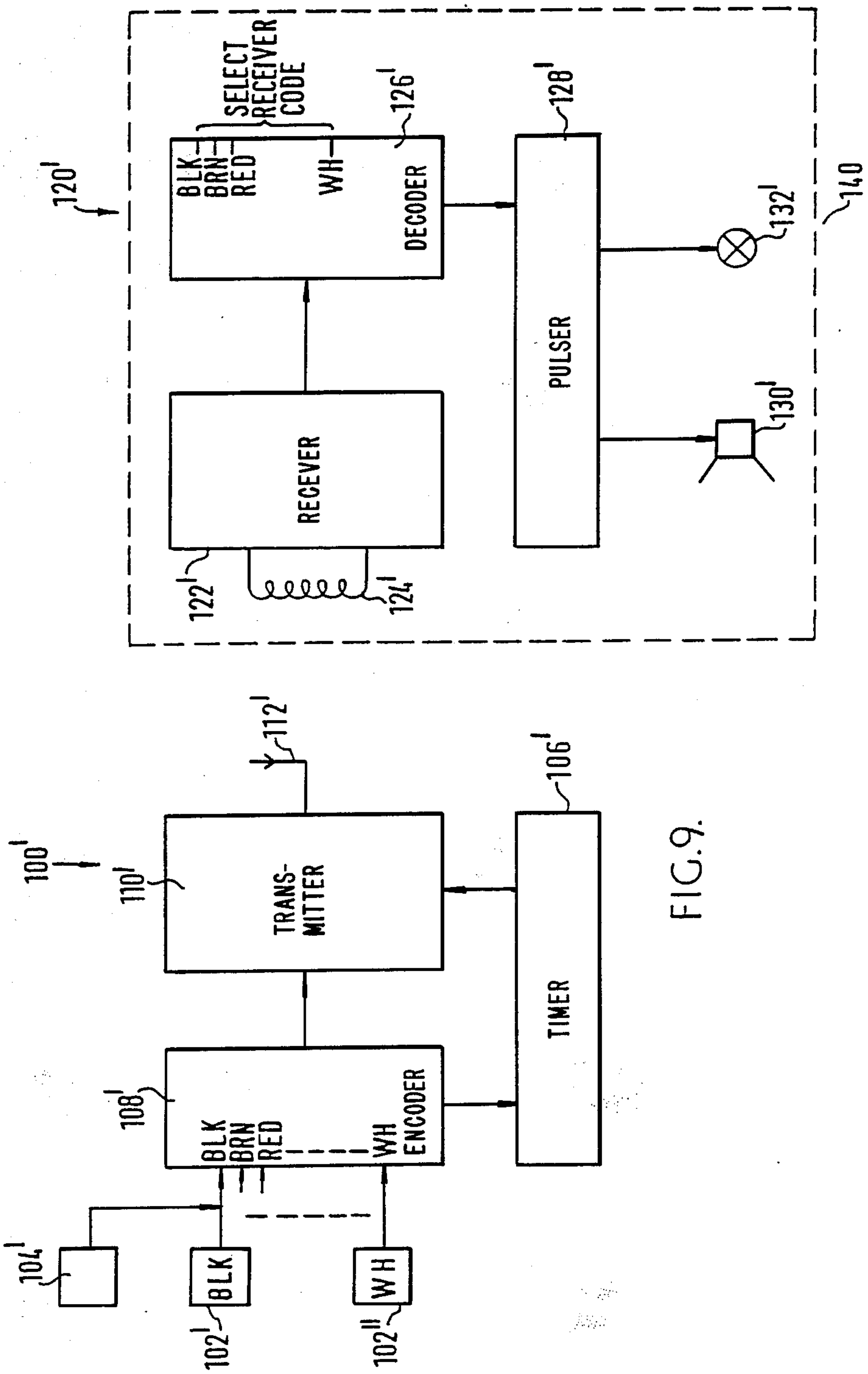
FIG. 9 is a block diagram similar to FIG. 8 but providing for selective transmission of differently coded address signals for addressing selectively a plurality of locator devices.

The more sophisticated system shown in FIG. 9 is basically similar to that of FIG. 8 and comprises similar elements which are identified by corresponding reference numerals with primes added. This system is designed for a plurality of coded address signals activated by corresponding push switches, preferably colour-coded as shown, and decoder 126' in the receiver unit has provision for selection of the address code to which the receiver unit will respond. The drawing indicates that the receiver unit may be in a colour-coded enclosure 140, though the colour-coding may be shown in other ways as previously mentioned herein.

Arrangements similar to those shown in FIGS. 8 and 9 can be employed for other modes of signal transmission, the antennas 112 or 112' and 122 or 122' being replaced by suitable emitters and detectors of sound, ultra-sound, infra-red or visible light, for example. In the case of sound/acoustic transmission the circuitry can readily be rearranged and designed so that the emitter 130 or 130' doubles as the address-signal detector microphone. This arrangement involves some delay in response time, but this will be insignificant to the user.

The coding system envisaged is binary. It is also envisaged as advantageous to make the responder emit signals determined by the code received. The receiver and decoder can be so designed that two binary 1's next to each other in the transmission will result in a longer bleep. Thus, using a 5-bit code, the responder can be made to emit up to three bleeps of short duration or two of long long duration (the alternatives being: ., .., ..., .—, —., — or ——).

The audible bleep patterns emitted by the transponder may be of single frequency or a plurality of frequencies—for example, alternatively high and low frequencies.

The following notes are given as to the current status of development of miniature locator system embodying the present invention, the size of the locator device ("bleeper") being specified as no larger than 50×30×15 millimeters (this being the size of a typical pocket match-box), and the various ideas which are currently being investigated to realise the objective within specified, low cost of the system when manufactured in quantity.

IMPLEMENTATION OF DATA ENCODING AND DECODING CIRCUITRY

Tests using the Plessey SL490 chip indicate that this is quite suitable for generation of digital P.P.M. (pulse-position-modulated) codes in the transmitter. A timer and bleeper circuit has been designed and tested: this will sound an alarm if the transmitter is not reused or returned to its wall bracket at a certain time—say about 1 minute—after it has been removed from its bracket and used to transmit a search signal. Ultra low power circuitry using standard CMOS devices has been designed to decode the P.P.M. codes from the transmitter, to control turning on and off of the receiver circuitry and to drive a piezo ceramic audio bleeper and filament lamp (or LED). The circuitry has been tested to confirm correct decoding of incoming data and rejection of incorrect data and noise. Operation at 3V (the minimum recommended for the prototype circuitry) results in low power consumption but gives an adequate sound level from the bleeper.

IMPLEMENTATION OF TRANSMITTER AND RECEIVER CIRCUITRY

RF transmitter circuitry operating at 100 kHz and modulated by an SL 490 chip has been constructed and is under evaluation. The transmitter coil being used measures approximately 8"×5" (approximately 200 mm×130 mm) although a circular coil of 5" (approximately 130 mm) diameter has also been tried and found to give similar results. The receiver coil measures approximately $7\frac{1}{4}$"×$\frac{3}{4}$" (approximately 30 mm×20 mm). This feeds a balanced mixer circuit which, in turn, is connected to an amplifier and filter stage. The second input to the mixer is supplied by an oscillator tuned to the frequency of the transmitter plus a fixed offset. The use of the mixing technique allows the receiver to remain tuned to the transmitter even when metal objects (e.g. keys) detune the receiver coil. Currently, it has not proved possible to achieve correct operation up to the required range of 20 feet or 6 meters. The difficulties experienced stem primarily from the fact that the received signal strength falls in proportion to the cube of the distance from the transmitter so that for example, the signal strength at 20 feet or 6 meters is $\frac{1}{8}$ of that at 10 feet or 3 meters. Furthermore, the complexity of the receiver which may be developed is limited by the fact that circuitry will not be integrated onto the semicustom chip (which will perform the digital decoding, etc.) and hence must remain simple and of low cost.

In an effort to increase the operating range of the equipment the following modifications may be tried. The transmitter output power may be increased by the use of a "push-pull" driver stage and, if required, the power supply increased to, say, 18 V for the RF stages. Also the operating frequency may be reduced to approximately 32 kHz. This will have the advantage of reducing the current consumption in the receiver and it is hoped that this will allow the receiver circuitry to remain permanently energised (rather than being turned off and on periodically). This will allow the rate of the transmitted P.P.M. code to be reduced while still retaining an acceptably fast response of the bleeper to the transmitted signal. A lower data rate will permit the receiver band-width to be reduced and this will improve the noise rejection of the receiver.

The difficulties experienced to date with the RF link have prompted a re-examination of sonic and ultrasonic techniques as a means of activating the bleeper device. These alternatives would appear to offer a number of advantages and disadvantages, as follows—

Sonic

This would make use of the existing audio transducers in the transmitter (alarm sounder) and receiver (bleeper). The transmitter would emit a sequence of audio pulses, coded to select a particular bleeper. The receiver device would use the audio transducer as a microphone. Upon detection of a correctly encoded signal, the transducer would be driven as an audible bleeper. Once activated, the bleeper would remain sounding for several seconds after termination of the coded transmission since it would not be possible to hear the bleeper during the transmission. Given that the acoustic output of the transmitter could by much greater than that of the receiver, it could probably be guaranteed that whenever the bleeper was in audible range of the user, the bleeper would also be within acoustic range of the transmitter.

The primary advantages of sonics communication are—the elimination of coils in the receiver and transmitter, only one audio transducer being required in each device, and no restriction placed on the equipment by Government regulations. However, the high level audio output of the transmitter might be a source of annoyance and discomfort to the user (or others). Furthermore, due to reflections of the transmitted sound within a typical room, the receiver would be subjected to a high level of "multipath" interference. To combat this, the rate of the transmitted code would have to be reduced. This would mean that transmission for a period of at least 3 seconds would be required to activate a bleeper (within range of the transmitter).

Ultra-Sonics

This would require an ultra-sonic transducer in each of the transmitter and receiver units in addition to the audio transducers. Coding of the transmitted signal would be as for the sonics transmission. However, in this case, the ultra-sonic signal would not mask the audible output from the bleeper, so that the latter would be required to operate only during receipt of correct data from the transmitter. Thus the advantages of the ultra-sonics system would be—no annoyance or discomfort to the user and no masking of the bleeper device during transmission. As above, multipath interference would be present. Also, since the attenuation at ultra-sonic frequencies is greater than that for audio, under certain circumstances a bleeper could be within audible range of the user but out of range of the ultrasonic transmitter.

Conclusion

There have thus been described and illustrated a number of modes of carrying out the invention, which can be implemented in practice by a person skilled in the art, to suit particular purposes and environments. Such a person will no doubt appreciate that there are further modes and features falling within the scope of the invention as defined in the following claims.

I claim:

1. Locator means for assisting in locating an object, said means comprising a transmitter-transponder system which comprises a hand-held searcher device comprising a short-range signal transmitter powered by an electric cell or battery in the device and having electronic circuitry for generating an address signal to be emitted on activation of the transmitter by switching means incorporated in the searcher device, and a locator device comprising a transponder powered by an electric cell or battery within the locator device and having signal detector means with electronic circuitry and means for emitting a sound signal in response to a particular address signal received from the searcher device, characterized in that the electronic circuitry of the searcher device is such as to generate an address signal of binary-coded pulse-position-modulated form, the locator device is of a size wherein the largest dimension is substantially no greater than about 50 millimeters and the electronic circuitry of the transponder is responsive to a particular pulse-position-modulated binary address signal and is such as to remain in a passive listening mode, minimizing current flow from the battery, until the detector means receives a signal of sufficient strength and having a form to which its circuitry is adapted to respond, the locator device emitting its sound signal in the form of a series of tones which is determined by the form of the address signal to which it is responsive, thereby identifying the locator device to someone using the searcher device, and the transponder circuitry is such as to cause emission of the sound signal after receipt of the address signal so that the locator signal can be heard after the transmitted signal has ceased.

2. A monitoring or alarm system comprising locator means according to claim 1, the searcher device being adapted for connection to other switching means, external to the searcher device, to cause activation of the transmitter on the occurrence of an event causing operation of the external switching means.

3. Locator means according to claim 1, characterised in that the locator device includes means for emitting a light signal in addition to the sound signal.

4. Locator means according to claim 1, characterised in that the circuitry in the locator device includes means for switching off the emission after a certain time when reception of the address signal from the searcher device has ceased.

5. Locator means according to claim 1, characterised in that the searcher device circuitry is such as to produce any one of a plurality of such address signals, the switching means being such as to cause selective activation of the circuitry for emission of a selected one of the address signals.

6. Locator means according to claim 1, characterised in that the searcher device incorporates means for emitting an alarm signal a certain time after it has been used, if it has not been returned to a stowage where it is to be kept when not in use, the searcher device having switching means cooperating with the stowage for disabling the alarm signal means.

7. Locator means according to claim 1, characterised in that the means in the locator device for emitting a sound signal also serves as a microphone for receiving the transmitted signal, the electronic circuitry in the locator device being such as to cause suppression of the microphone or listening mode each time a signal is detected.

8. A locator device for use in a transmitter-transponder system constituting locator means for assisting in locating an object, wherein the locator means includes a hand-held searcher device comprising a short range signal transmitter powered by an electric cell or battery in a device and having electronic circuitry for generating an address signal to be emitted on activation of the transmitter by switching means incorporated in the searcher device, said locator device comprising a transponder powered by an electric cell or battery within the locator device and having signal detector means with electronic circuitry and means for emitting a sound signal in response to the particular address signal received from the searcher device, the electronic circuitry of the searcher device being such as to generate an address signal of binary-coded pulse-position-modulated form, said locator device being of a size wherein the largest dimension is substantially no greater than about 50 millimeters and the electronic circuitry of the transponder is responsive to a particular pulse-position modulated binary address signal and is such as to remain in a passive listening mode, minimizing current flow from the battery, until the detector means receives a signal of sufficient strength and having a form to which a circuitry is adapted to respond, the locator device emitting its sound signal in the form of a series of tones which is determined by the form of the address signal to which it is responsive, and the transponder circuitry causing emission of the sound signal after receipt of the address signal so that the locator signal can be heard after the transmitted signal has ceased.

* * * * *